(12) United States Patent
Goel

(10) Patent No.: US 7,987,143 B2
(45) Date of Patent: Jul. 26, 2011

(54) METHODS AND SYSTEMS FOR MULTI-OBJECTIVE EVOLUTIONARY ALGORITHM BASED ENGINEERING DESGIN OPTIMIZATION

(75) Inventor: Tushar Goel, Livermore, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 41 days.

(21) Appl. No.: 12/702,939

(22) Filed: Feb. 9, 2010

(65) Prior Publication Data

US 2011/0078100 A1 Mar. 31, 2011

Related U.S. Application Data

(60) Provisional application No. 61/246,971, filed on Sep. 29, 2009.

(51) Int. Cl.
*G06N 3/12* (2006.01)
(52) U.S. Cl. .......................................... 706/13
(58) Field of Classification Search ....................... 706/13
See application file for complete search history.

(56) References Cited

OTHER PUBLICATIONS

Goel et al ("Response surface approximation of Pareto optimal front in multi-objective optimization" 2006).*
Trautmann et al ("A Convergence Criterion for Multiobjective Evolutionary Algorithms Based on Systematic Statistical Testing" 2008).*
EPO Search Report for Application Ser. No. 10172879.8-1225, Jan. 20, 2011.
J. L. Guerrero, J. Garica, L. Marti, J.M. Molina, A. Berlanga, "A stopping criterion based on Kalman estimation techniques with several progress indicators", Proceedings of the 11th Annual conference on Genetic and evolutionary computation (GECCO '09) Jul. 9, 2009 pp. 587-594.
E. Zitzler, L. Thiele, M. Laumanns, C. M. Fonseca, and V. Grunert da Fonseca. "Performance Assessment of Multiobjective Optimizers: An Analysis and Review" IEEE Transactions on Evolutionary Computation, 7(2):117-132, 2003.
T. Wagner, H. Trautmann, B. Naujoks, "OCD: Online Convergence Detection for Evolutionary Multi-Objective Algorithms Based on Statistical Testing", Lecture Notes in computer science, vol. 5467, Apr. 7, 2009, pp. 198-215.
J. B. Kollat, Reed: "The value of online adaptive search: a comparison of NSGA-II, e-NSGAII and eMOEA", Lecture Notes in computer science, vol. 3410, Jan. 28, 2005, pp. 386-398.
T. Goel, N. Stander: "A study on the convergence of multiobjective evolutionary algorithms" Preprint submitted to the 13th AIAA/ISSMO conference on Multidisciplinary Analysis Optimization May 3, 2010 pp. 1-18.

(Continued)

*Primary Examiner* — Jeffrey A Gaffin
*Assistant Examiner* — Lut Wong
(74) *Attorney, Agent, or Firm* — Roger H. Chu

(57) ABSTRACT

The present invention discloses systems and methods of conducting multi-objective evolutionary algorithm (MOEA) based engineering design optimization of a product (e.g., automobile, cellular phone, etc.). Particularly, the present invention discloses an archive configured for monitoring the progress and characterizing the performance of the MOEA based optimization. Further, an optimization performance indicator is created using the archive's update history. The optimization performance indicator is used as a metric of the current state of the optimization. Finally, a stopping or termination criterion for the MOEA based optimization is determined using a measurement derived from the optimization performance indicators. For example, a confirmation of a "knee" formation has developed in the optimization performance indicators. The optimization performance indicators include, but are not limited to, consolidation ratio, improvement ratio, hypervolume.

11 Claims, 9 Drawing Sheets

OTHER PUBLICATIONS

T. Goel, N. Stander: "Non-dominance-based online stopping criterion for multi-objective evolutionary algorithms" International Journal for Numerical Methods in Engineering, vol. 84, No. 6, May 4, 2010, pp. 661-684.

Tanaka M, et al, "GA-based Decision Support System for Multi-Criteria Optimization", in Proceedings of the International Conference on Systems, Man and Cybernetics, 2: 1556-1561, 1995.

Osyczka A, Kundu S, "A New Method to Solve Generalized Multicriteria Optimization Using the Simple Genetic Algorithm", Structural Optimization, 10(2): 94-99, 1995.

Craig KJ, Stander N, Dooge DA, Varadappa S, "Automotive Crashworthiness Design Using Response Surface-Based Variable Screening and Optimization", Engineering Computations, 22:38-61, 2005.

Akkerman A, Thyagarajan R, Stander N, Burger M, Kuhm R, Rajic H, "Shape Optimization for Crashworthiness Design using Response Surfaces", In Proceedings of the International Workshop on Multidisciplinary Design Optimization, Pretoria SA, 270-279, 2000.

* cited by examiner

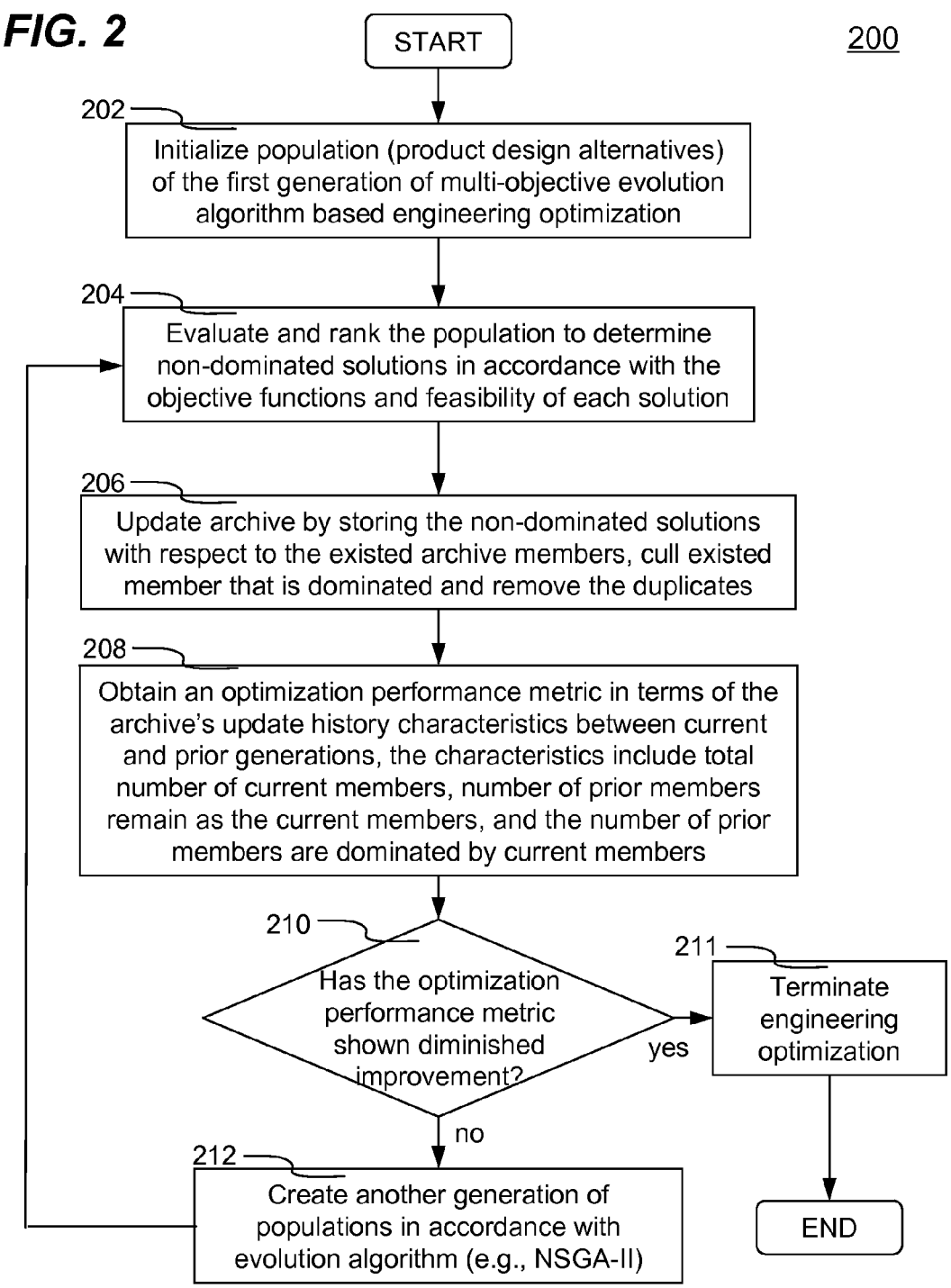

METHODS AND SYSTEMS FOR MULTI-OBJECTIVE EVOLUTIONARY ALGORITHM BASED ENGINEERING DESGIN OPTIMIZATION

CROSS REFERENCE TO RELATED APPLICATIONS

This application claims priority from a co-pending U.S. Provisional Patent Application Ser. No. 61/246,971 for "SYSTEM AND METHOD OF DETERMINING STOPPING CRITERION OF MULTI-OBJECTIVE EVOLUTION ALGORITHMS USED IN ENGINEERING DESIGN OPTIMIZATION", filed on Sep. 29, 2009, the entire contents of which are incorporated herein by reference.

FIELD OF THE INVENTION

The present invention generally relates to engineering design optimization, more particularly to performance estimate and termination criteria used in a multi-objective evolutionary algorithm (MOEA) based engineering design optimization.

BACKGROUND OF THE INVENTION

Today, computer aided engineering (CAE) has been used for supporting engineers in tasks such as analysis, simulation, design, manufacture, etc. In a conventional engineering design procedure, CAE analysis (e.g., finite element analysis (FEA), finite difference analysis, meshless analysis, computational fluid dynamics (CFD) analysis, modal analysis for reducing noise-vibration-harshness (NVH), etc.) has been employed to evaluate responses (e.g., stresses, displacements, etc.). Using automobile design as an example, a particular version or design of a car is analyzed using FEA to obtain the responses due to certain loading conditions. Engineers will then try to improve the car design by modifying certain parameters or design variables (e.g., thickness of the steel shell, locations of the frames, etc.) based on specific objectives and constraints. Another FEA is conducted to reflect these changes until a "best" design has been achieved. However, this approach generally depends on knowledge of the engineers or based on a trial-or-error method.

Furthermore, as often in any engineering problems or projects, these objectives and constraints are generally in conflict and interact with one another and design variables in nonlinear manners. Thus, it is not very clear how to modify them to achieve the "best" design or trade-off. This situation becomes even more complex in a multi-discipline optimization that requires several different CAE analyses (e.g., FEA, CFD and NVH) to meet a set of conflicting objectives. To solve this problem, a systematic approach to identify the "best" design, referred to as design optimization, is used.

The optimization of such systems with more than one objective functions is referred to as multi-objective optimization. Contrary to the single-objective optimization problems (SOPs), the multi-objective optimization problems (MOPs) do not yield a single optimum solution. Instead, it results in a set of optimal solutions that represent different trade-offs among objectives. These solutions are referred to as Pareto optimal solutions or Pareto optimal solution set. Design objective function space representation of the Pareto optimal solution set is known as Pareto optimal front (POF). One of the most common strategies to find Pareto optimal solutions is to convert the multi-objective optimization problem to a single objective optimization problem and then find a single trade-off solution. There are multiple ways of converting a MOP to a SOP, namely, weighted sum strategy, inverted utility functions, goal programming, $\epsilon$-constraint strategy, etc. Drawbacks from this prior art approach of converting MOP to SOP are that each optimization simulation results in a single trade-off, and multiple simulations may not end in sufficiently diverse trade-off solutions.

Recently, one of the engineering design optimization methodologies is based on genetic algorithm (GA) or evolutionary algorithm. Genetic algorithms have been demonstrated to efficiently solve multi-objective optimization problems because they result in a diverse set of trade-off solutions in a single numerical simulation. The drawback, however, is that GA requires tens of thousands of simulations to converge to the global POF. This becomes a larger problem in terms of computational cost, especially when the evaluation of each design alternative requires a sophisticated time-consuming FEA (e.g., a car crash simulation, a modal analysis for NVH, etc.).

In order to reduce the computational cost, some of the prior art approaches have been focused on developing more efficient algorithms (e.g., micro-GA, Pareto solution based efficient global optimization (ParEGO)), improving efficiency of existing algorithms, using combination of local search methods with GA, or using approximation models for fitness evaluation. However, these approaches do not account for the fact that the computational expense incurred by the optimization algorithm is miniscule compared to the computational cost of evaluating designs in industrial problems. Instead, an ad hoc solution has been to set a limit on the maximum number of generations or maximum number of design objective function evaluations. It would, therefore, be desirable to have improved methods and systems for performing a MOEA based engineering design optimization more efficiently and effectively.

SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses systems and methods of conducting multi-objective evolutionary algorithm (MOEA) based engineering design optimization of a product (e.g., automobile, cellular phone, etc.). Particularly, the present invention discloses an archive configured for monitoring the progress and characterizing the performance of the MOEA based optimization. Further, an optimization performance metric or indicator is created using the archive's update history. The optimization performance metric is used as an indicator of the current state of the optimization. Finally, a stopping or termination criterion for the MOEA based optimization is created using a measurement derived from the optimization performance metric, for example, a utility function in terms of optimization performance indicator.

According to one aspect of the present invention, an archive is created to store all of the non-dominated solutions in conjunction with traditional MOEA based optimization (e.g., Non-dominated Sorting Genetic Algorithm (NSGA-II)). MOEA based optimization starts with an initial generation of populations (i.e., a set of product design alternatives) created or chosen from a design space. Design objective functions are then evaluated for each of the design alternatives. The evaluation result or solution is ranked with one another. Some of the solutions are determined to be non-dominated with respect to the current set of solutions. These non-dominated solutions are used for creating and/or updating the archive. To update the archive, the newly determined non-dominated solutions are compared with existing members of the archive. Those solutions or members are determined to be dominated by another are culled from the archive, while the remaining non-dominated solutions are stored into the archive. Further, any duplicated solutions or members are eliminated from the archive (or never added into the archive depending upon implementation).

The archive is configured to be updated after each generation of the MOEA. Characteristics of the archive update history is kept and tracked as a performance metric or indicator of the MOEA based optimization. The characteristics may include, but are not limited to, total number of members in the archive after a particular generation, the number of non-dominated solutions that remain non-dominated between prior and current generations, and the number of existing members dominated by newly determined solutions between the two generations. The prior and the current generations are configured to be apart with a generation gap of at least one generation.

According to another aspect, the optimization performance metric is configured to track quality of the solutions or members in the archive. One exemplary metric is referred to as consolidation ratio, which represents the proportion of the solutions in the archive that remains non-dominated with respect of new solutions. Another exemplary metric, improvement ratio, represents the proportion of non-dominated solutions from previous generation that becomes dominated by the newly determined solutions. Both metrics do not require a priori information about the global Pareto front and no additional parameter is required.

According to yet another aspect, a stopping or termination criterion is configured using the optimization performance metrics derived from the characteristics of the archive. The termination criterion is defined as a confirmation of a "knee" formation in the optimization performance metrics.

The stopping or termination criterion can be either static or dynamic. For example, a static convergence criterion can be set to a predefined threshold for consolidation ratio. The MOEA based engineering design optimization would stop when the threshold consolidation ratio has been reached after certain numbers of generations. The dynamic convergence criterion is more complex. It requires a utility function to indicate whether the optimization has reached a good trade-off such that further simulations would produce diminished improvement.

In one embodiment, an average utility at the $i^{th}$ generation is estimated using consolidation ratio and generation gap. A predetermined threshold utility value is defined and used for termination the computer simulation of the MOEA based engineering design optimization. In another embodiment, the utility function is based on hypervolume of the archive's existing members at each generation.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 2 is a flowchart illustrating an exemplary process of conducting MOEA based engineering design optimization using an archive for monitoring the progress and characterizing the performance, according to an embodiment of the present invention;

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-8. However, those skilled in the art will readily appreciate that the detailed description given herein with respect to these figures is for explanatory purposes as the invention extends beyond these limited embodiments.

Figure 1A:
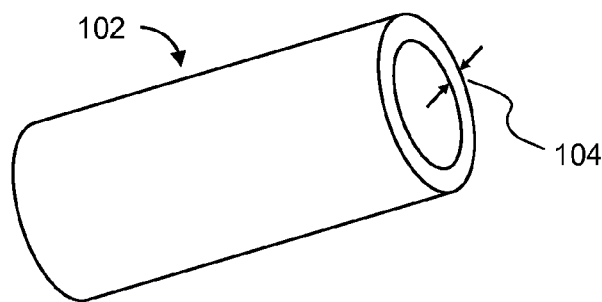
FIG. 1A is a diagram showing a tubular member (an exemplary engineering product) to be optimized using thickness as design variable.

Referring first of FIG. 1A, a tubular structural member 102 (i.e., an exemplary engineering product) is optimized in an engineering optimization with design objective of minimizing the weight therefore minimizing the cost for a given material (e.g., regular strength steel) under certain design loading condition. It is evident that thinner thickness 104 would lead to a less weight structure. However, at certain point, the structural would become too weak to stand a design load (e.g., structural failure due to material yielding and/or buckling). Hence, the engineering optimization of this tubular structure requires another design objective of maximizing the strength, which leads to a safer structure. In this exemplary case, thickness 104 is a design variable, which may have a range (e.g., from one eighth of inch to half an inch) as a design space. Any design alternatives are selected from this space. In multi-objective evolutionary algorithm, population or design alternatives at each generation are selected from the design space.

The design space is one-dimensional (e.g., a line) when there is only one design variable. The design space becomes a two-dimensional area for two variables, and so on. For more than three design variables, the design space is a hyperspace that is not possible to illustrate.

Figure 1B:
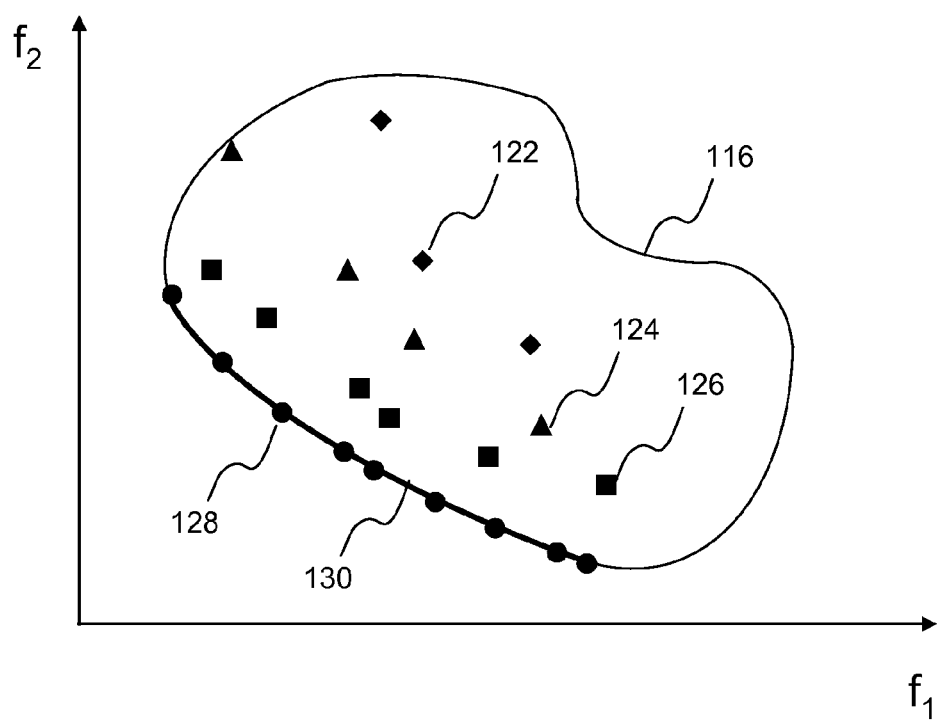
FIG. 1B is a diagram showing exemplary solutions including Pareto optimal solutions in a multi-objective functional space.

Based on two conflicting design objectives, FIG. 1B is an X-Y diagram showing a results of an exemplary design optimization. Two axes represent two different objectives in form of functions $f_1$ and $f_2$. In a multi-objective optimization, there is no one optimized solution instead there is a set of solutions that reflects tradeoffs among objectives. In order to differentiate each solution, a concept called non-domination criterion is used for comparing solutions.

Figure 1C:
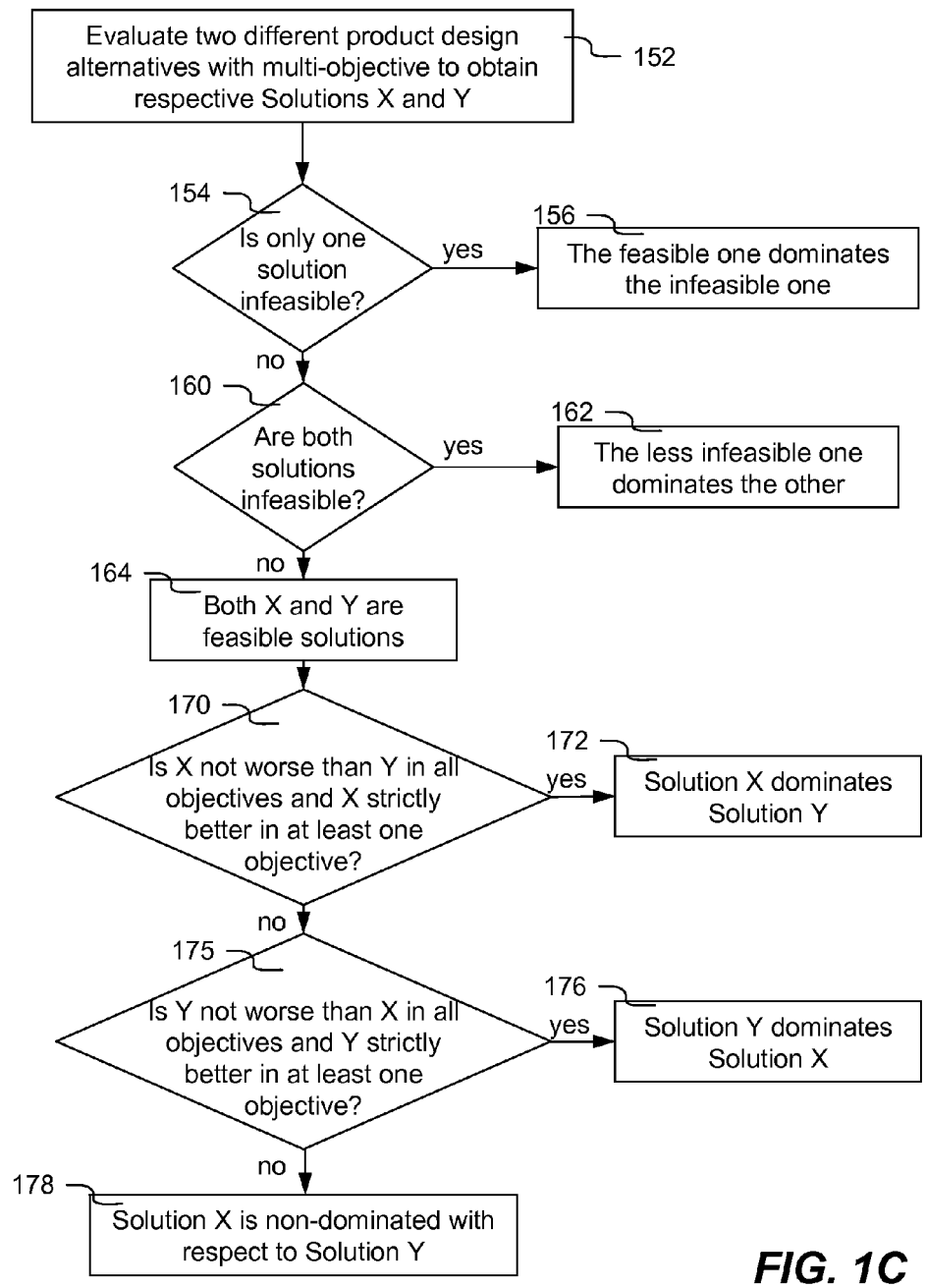
FIG. 1C is a flowchart illustrating an exemplary process of determining non-dominated solution criterion used in implementing one embodiment of the present invention.
Figure 3:
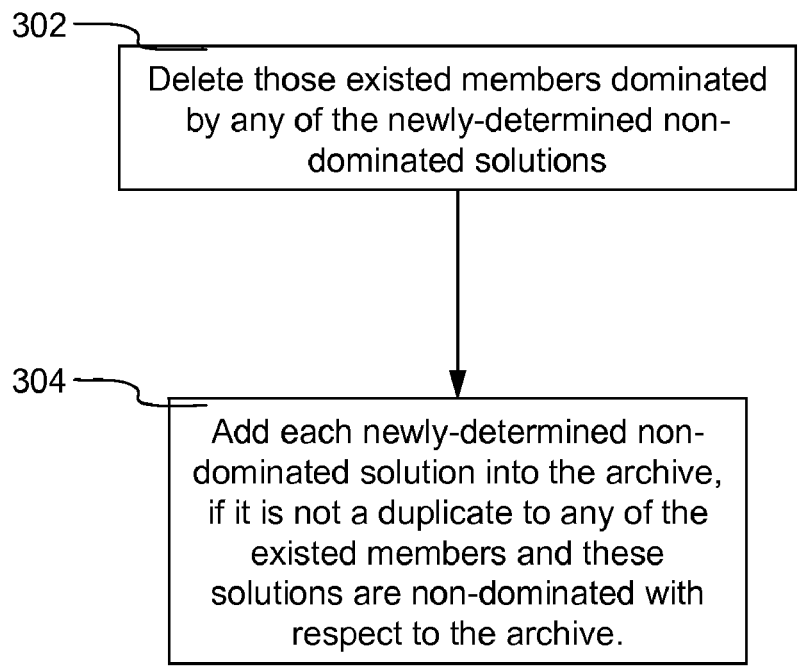
FIG. 3 is a flowchart illustrating an exemplary process of updating the archive.

FIG. 1C is a flowchart illustrating an exemplary process of determining the non-domination criterion. Two design alternatives are evaluated to obtain respective solutions X and Y according to the design objective functions (i.e., multi-objective) 152. Solution X dominates Y (step 172), if any of the following three conditions is true.
1. X is feasible and Y is infeasible. (Steps 154 and 156)
2. Both X and Y are infeasible (step 160), but X is less infeasible compared to Y (step 162).
3. When both X and Y are feasible (step 164), the following two conditions must be satisfied (steps 170 and 172):
   a. X is not worse than Y in all design objectives; and
   b. X is strictly better than Y in at least one design objective.

Furthermore, one can determine if the solution Y dominates X (steps 175 and 176). Finally, if neither solution dominates the other, X and Y are non-dominated to each other (step 178).

FIG. 1B shows a two-objective unconstrained minimization example. Each dot represents an evaluated solution of a design alternative (e.g., one of the populations in a given generation of the MOEA) within area 116. In accordance with the non-domination criterion, for each diamond 122, there is at least one triangle 124 that is better than the diamond 122 in at least one objective without being inferior in other objective. So all individual solutions in diamond 122 are dominated by the triangles 124. Similarly, all triangles 124 are dominated by squares 126 and squares are dominated by circles 128. No solution represented by triangles 124 can be said better than any other solution represented by triangles 124, thus they are non-dominated with respect to each other. All individuals represented by circles 128 are non-dominated with respect to any other individual hence having a best or highest rank (e.g., rank of one). If all points represented by circles are removed from FIG. 1B, then the individuals represented by squares 126 become non-dominated with respect to all others. Therefore, squares 128 are assigned next best rank (e.g., rank of two), and so on.

In the example shown in FIG. 1B, circles 128 represent a set of Pareto optimal solution and the line 130 connecting all circles 128 is called the Pareto optimal front. It is noted that there would generally be more than one individual or solution having the same rank.

FIG. 2 is a flowchart showing an exemplary process 200 of conducting multi-objective evolutionary algorithm based engineering optimization in accordance with one embodiment of the present invention. Process 200 is preferably implemented in software to be executed in a computer system.

At step 202, process 200 starts by initializing a set of product design alternatives (i.e., populations of the initial generation). The design alternatives can be generated arbitrarily (e.g., randomly selected from a design space, regularly assigned with a regular interval for each design variable in the design space, etc.). For practical use, the size of populations is determined by a user of the computer simulation of the MOEA based optimization. In another embodiment, the size of populations can be set in the application module or software.

Next at step 204, process 200 evaluates the design alternatives using the design objective functions. For MOEA based optimization, there are more than one design objective functions to be evaluated. The evaluation of each of the design alternatives can be accomplished in many forms. For engineering product such as automobile, the evaluation has been often conducted with a computer aided engineering analysis (e.g., finite element analysis, meshfree analysis, etc.). Evaluation of design objective functions varies with different degrees of complicity from very straight forward to highly complex. In one example, when weight of a structure is used as a design objective function, the evaluation can be done by adding the weight of each component in the structure. In another, when natural vibration frequencies are used, the evaluation must be done with a model analysis which can require large computational resources (e.g., finite element analysis in a computer, plus engineering time to set up the analysis model). After obtaining respective solutions (i.e., evaluation) of all the individual design alternatives in the population at current generation, the solutions are ranked to determined which one or ones are non-dominated. This can be performed with the exemplary method set forth in FIG. 1C.

Figure 6:
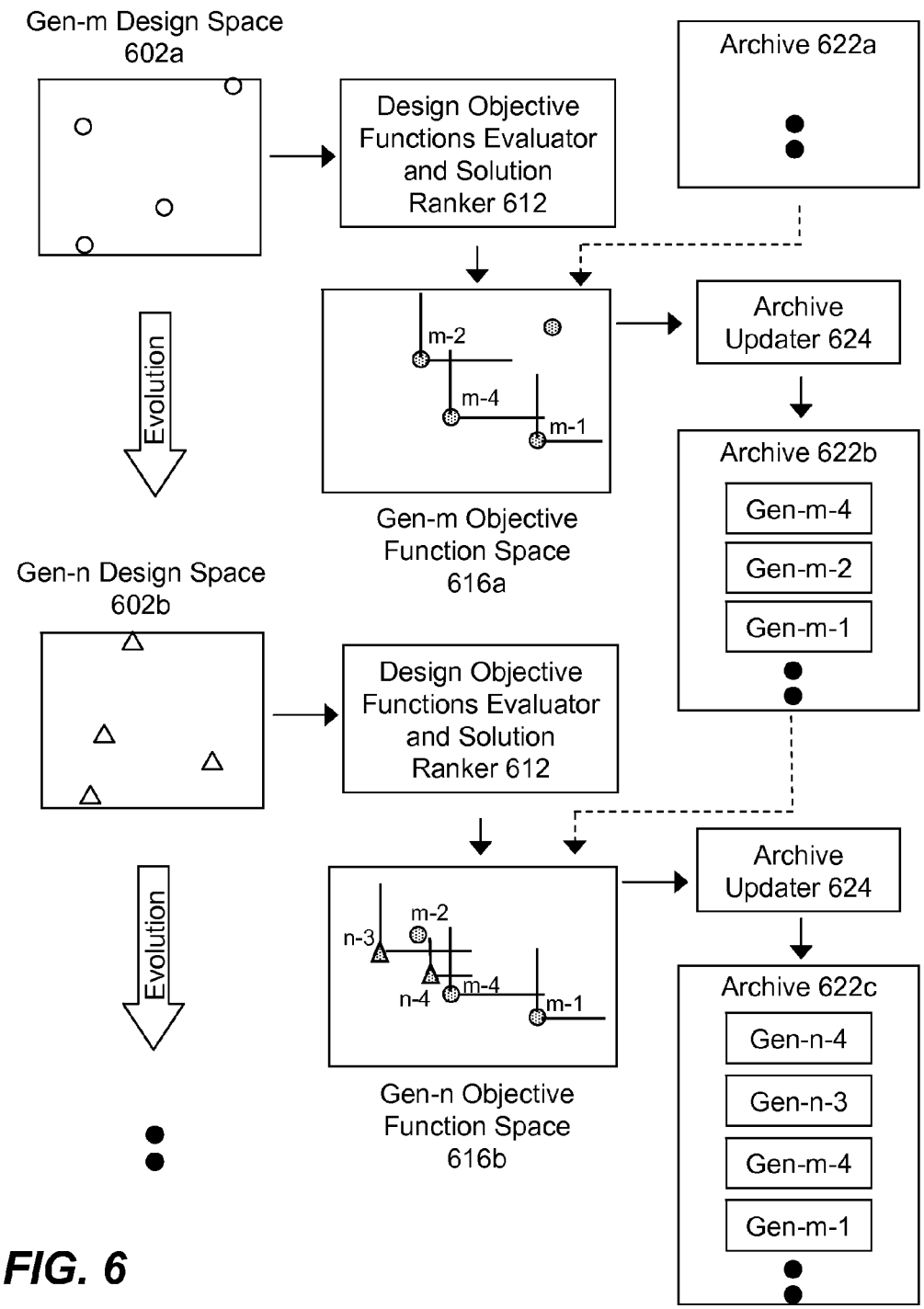
FIG. 6 is a schematic diagram showing an exemplary system for conducting MOEA based engineering design optimization in accordance with one embodiment of the present invention.

At step 206, non-dominated solutions are used for updating the archive. The archive holds only solutions or members that are non-dominated to one another. Any existing solutions or members that are determined to be dominated by the newly obtained solutions of the current generation are culled from the archive (step 302 of FIG. 3). Then each of the newly obtained non-dominated solutions is added into the archive provided that it is not a duplicate of any existing member or solution (step 304 of FIG. 3). Updating and ranking of the archive are performed after evaluation of each generation of the MOEA based optimization as shown in FIG. 6, for example, design objective functions evaluator 612 and solution ranker 614 after generations "Gen-A" 602a, "Gen-B" 602b, etc. The design objectives evaluator 612 can be achieved with a computer aided engineering analysis (e.g., finite element analysis). Solution ranker 614 is configured for performing comparison between a pair of solutions with process set forth in FIG. 1C. Non-dominated solutions are results of the solution ranker 614.

To demonstrate how an archive 622 is updated between two consecutive generations (e.g., 'Gen-m' and 'Gen-n') of the MOEA based optimization, the exemplary sequence is shown in FIG. 6. For illustration simplicity, design space of 'Gen-m' 602a is shown to have four individual design alternatives (shown in hollow circles). In practice, each generation can have arbitrary numbers of design alternatives, for example, 8, 20, 44, 80, 194, etc. Design objective function evaluator and solution ranker 612 is configured for evaluating all design alternatives in 'Gen-m'. Further, the design alternatives from 'Gen-m' are compared with the existing members from the archive to determine which one or ones remain non-dominated. The results are shown in objective function space for 'Gen-m' 616a. In this example, design alternatives 'm-4', 'm-2' and 'm-1' are determined to be non-dominated solutions in accordance with the process described in FIG. 1C above. These non-dominated solutions are used for updating archive (shown as 622a) in an archive updater 624. In this case, all three are determined to be non-dominated with respect to the existing members, thereby adding into the archive (shown as 622b).

Next, the MOEA based optimization moves to the next generation 'Gen-n' shown in a design space 602b. Again the design alternatives (shown in hollow triangles) are evaluated, ranked and compared with the archive's existing members. The results are shown in objective function space for 'Gen-n' 616b. In this example, design alternatives 'n-4' and 'n-3' are determined to be non-dominated, while the existing member 'm-2' is dominated by 'n-3'. As a result, member 'm-2' is deleted or culled from the archive 622 and 'n-4' and 'n-3' are added into the archive (shown as 622c). This procedure repeats and continues for another generation in the optimization.

It is noted that the archive 622 can be implemented electronically as a file or database in a storage device coupled to a computer system. The update history (e.g., members deleted and added at each generation) is kept and tracked as the basis for estimating the performance progress of the MOEA based optimization.

The characteristics of the archive's update history are used for creating an optimization performance metric or indicator at step 208. In one embodiment, the optimization performance metric is created between two generations (i.e., the current one and a prior one) using the total number of members in the archive and the number of the members remain non-dominated or being dominated from the prior to the current generations. The current and prior generations are apart with a generation gap of at least one generation.

In one embodiment, the optimization performance metric is configured to be a ratio (referred to as consolidation ratio) representing the proportion of potentially converged solutions. The consolidation ratio represents the fraction of archive $A_i$ that has evolved till (i-$\Delta$) generations. This is calculated as the ratio of number of members in archive $A_{i-\Delta}$ that are also present in archive $A_i$ (non-dominated solutions) to the size of archive A. The consolidation ratio (CR) can be expressed mathematically as follows:

$$CR = \frac{n(S)}{n(A_i)}; S = \{a_{i-\Delta} \text{ not dominated by } a_i\}, a_{i-\Delta} \in A_{i-\Delta}, a_i \in A_i$$

where n(A) is the size of set A. Generally, in the early phase of the MOEA based optimization, most non-dominated solutions in prior archive $A_{i-\Delta}$ would be dominated by the solutions in current archive $A_i$ due to evolution process, thus, resulting in a small value of CR. In the later phase of the MOEA based optimization, significantly better solutions would evolve, thereby, leading to a higher CR. In an ideal condition, CR would approach one when converged.

In another embodiment, the optimization performance metric is measured by a ratio (referred to as improvement ratio) quantifying the extent of improvement in the quality of evolved solutions. The improvement ratio represents the fraction of archive $A_{i-\Delta}$ dominated by the new solutions in archive A. The improvement ratio is calculated as the ratio of the number of members in archive $A_{i-\Delta}$ that are dominated by the members in archive $A_i$ (dominated solutions) to the size of archive $A_i$. The improvement ratio (IR) can be expressed mathematically as follows:

$$IR = \frac{n(Q)}{n(A_i)}; Q = \{a_{i-\Delta} \text{ dominated by } a_i\}, a_{i-\Delta} \in A_{i-\Delta}, a_i \in A_i$$

where n(A) is the size of set A. The archive $A_i$ includes all non-dominated members of archive $A_{i-\Delta}$ so no members of archive $A_i$ would be dominated. IR would have a high value in the early phase of the MOEA based optimization and would gradually reduce to zero in the limiting case when convergence is achieved.

Figure 4:
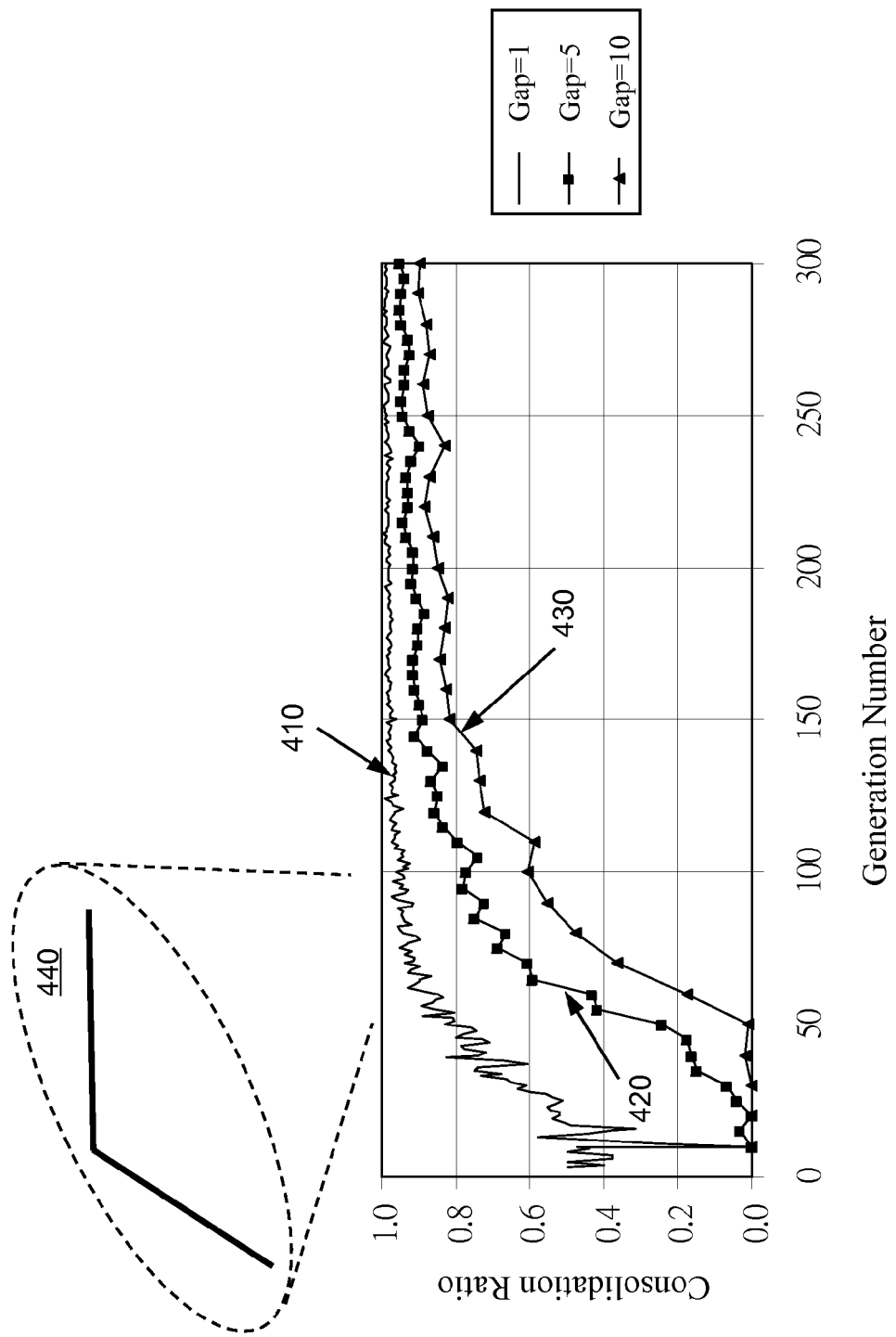
FIG. 4 is an X-Y diagram showing a plot of consolidation ratio versus generations comparing various generation gaps using an exemplary archive update history, according to an embodiment of the present invention.
Figure 5:
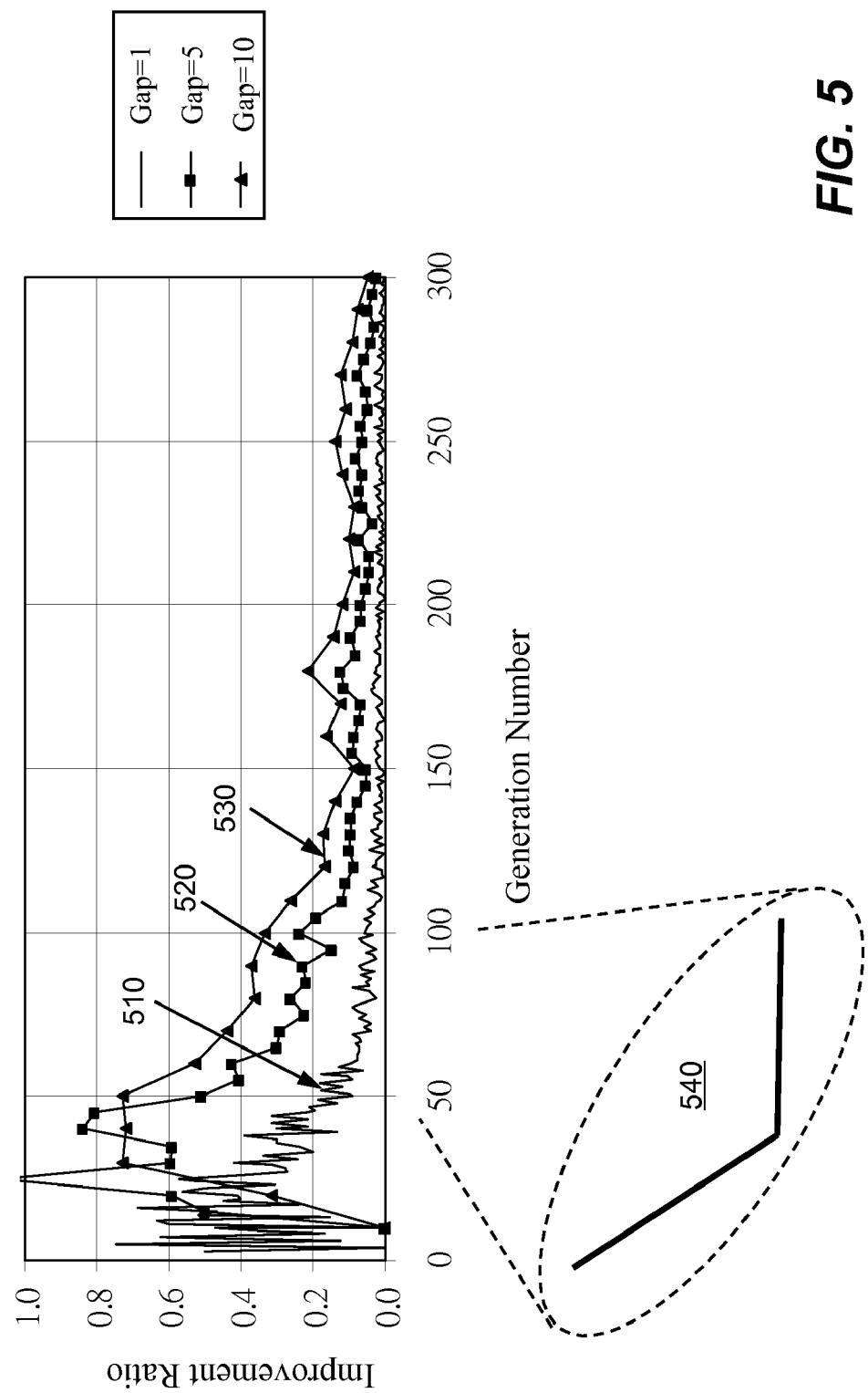
FIG. 5 is an X-Y chart showing a plot of improvement ratio versus generations comparing various generation gaps using an exemplary archive update history, according to an embodiment of the present invention.

An exemplary consolidation ratio versus generation diagram is shown in FIG. 4, while an exemplary improvement ratio versus generation diagram is shown in FIG. 5. Included in these two diagrams are CR and IR calculated using different generation gaps. For example, curves 410 and 510 are for a generation gap of one, curves 420 and 520 for a gap of five, and curves 430 and 530 for a gap of ten.

Referring now to decision 210, it is determined whether the optimization performance metric or indicator has shown diminished improvement. The decision 210 can be conducted with a number of manners. One approach is an observation of a confirmation of a "knee" formation, for example, "knee" formation 440 can be observed clearly from any of the three curves between generations 50 and 100 in FIG. 4. Similarly, "knee" formation 540 is also shown in FIG. 5. Once the "knee" formation has been confirmed, user (e.g., engineer, scientist, etc.) can declare an end of the optimization.

Other approaches are more quantitative. One of which is a static criterion. For example, a fixed threshold optimization performance indicator such as consolidation ratio $CR_t$ can be predefined by a user.

Another is a dynamic convergence criterion using a utility function derived from one of the optimization performance indicators. In the dynamic convergence criterion, the utility of additional generation is measured and the optimization terminates when the utility has fallen below a predefined threshold $U_t$. In one embodiment, the average utility of $i^{th}$ generation $U_i$ is estimated as the change of the consolidation ratio in a generation gap as follows: $U_i = (CR_i - CR_{i-\Delta})/\Delta$. $\Delta$ is a generation gap (i.e., an integer, for example, between 1 and 10).

To use the dynamic convergence criterion, a few other techniques should be considered. For example, due to rapid evolution, the consolidation ratio may be very small (near zero) in the very beginning of the MOEA based optimization. This could result the average utility to be very small or even negative. This deficiency can be avoid by applying dynamic convergence criterion only when CR has reached a larger number (e.g., 0.25 or above). In other words, the stopping criterion can be a combination of the static fixed ratio and the dynamic convergence criterion.

Another consideration is to use an average generation utility ($U_i^*$) instead of $U_i$ alone. For example, $U_i^* = (U_i + U_{i-\Delta})/N$ and N is an integer (e.g., between 2 and 5) such that $U_i^*$ is configured for avoiding premature termination due to low frequency noise in calculation of CR with generation gap $\Delta$ greater than one. The average technique used herein is referred to as a moving average sometimes.

Furthermore, the selection of utility threshold $U_t$ is critical to ensure a proper simulation of the MOEA based optimization. In one aspect of the present invention, $U_t$ can be defined as a fraction of initial utility $U_{init}$ (i.e., $U_t = U_{init}/F$), where F is a fraction parameter. For example, F=5 means that the average utility of each generation has fallen below 80% of the initial average utility of each generation. The initial utility is estimated based on the number of generations (G) taken for CR to achieve at least 0.25. That is $U_{init} = CR|_{\geq 0.25}/G$.

Using a numerical example shown in FIG. 4, it takes 90 generations for CR to reach 0.55 in the generation gap ($\Delta$=10) case. $U_{init}$ is calculated as follows: 0.55/90=0.006.

Figure 7:
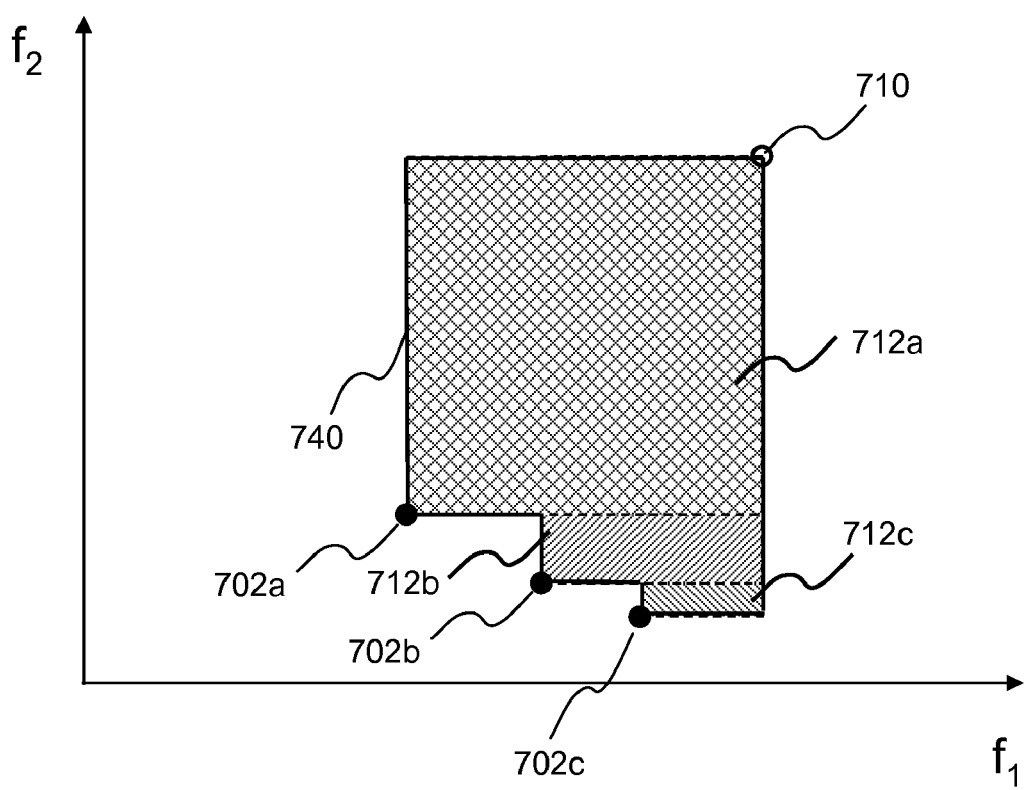
FIG. 7 is a diagram showing hypervolume of an exemplary set of non-dominated solutions in accordance with one embodiment of the present invention.

Instead of using consolidation ratio, other update history of the archive can also be used as a basis for forming the stopping or termination criterion, for example, cumulative hypervolume (HV) of the archive's existing members at each generation. FIG. 7 shows a cumulative hypervolume of an exemplary set of non-dominated solutions in an archive, according to an embodiment of the invention. For illustration simplicity, only three members or non-dominated solutions are shown in a two-dimensional objective function space. The present invention sets no limit as to how many design objective functions or number of members in an archive. In fact, the term "hypervolume" is referred to an equivalent volume in n-dimensional space. When "n" is a whole integer number great than two, the equivalent volume (i.e., hypervolume) cannot be drawn easily in a two-dimensional illustration.

Each of the three members 702a-c is a non-dominated solution in the archive at a particular generation of the MOEA based optimization. The cumulative hypervolume 740 is a mathematical union of individual hypervolumes (drawn as three different areas 712a-c in FIG. 7). Each hypervolume is calculated with respect to a reference point 710, which can be defined by a user. The reference point 710 should be relevant to cover the range of respective dimensions of design objective function space.

Furthermore, utility functions described above can be defined using HV instead of CR. A HV based utility function generally exhibits less volatile fluctuations in early stage thereby not requiring certain special considerations of the CR based utility function, for example, initial utility.

Referring back to decision 210, if the decision is "no", then process 200 moves to step 212 to create another generation of populations (product design alternatives) based on the MOEA (e.g., NSGA-II). The evolution schemes include, but are not limited to, binary tournament operator, simulated binary crossover (SBX) and polynomial mutation operators in real-coded space. Then process 200 moves back to step 204 for another evaluation and rank until the decision 210 becomes "yes". Process 200 ends by terminating the MOEA based optimization at step 211.

Figure 8:
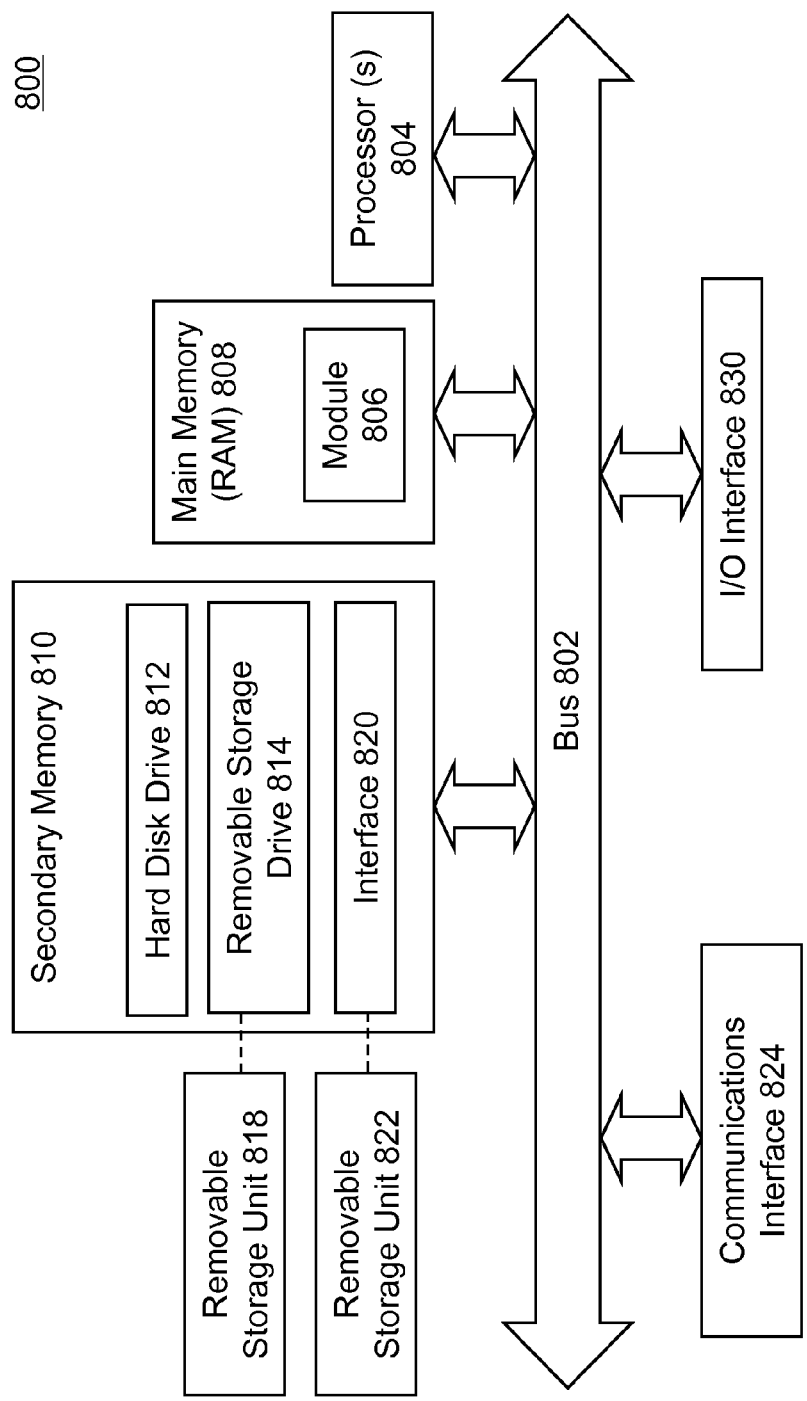
FIG. 8 is a function diagram showing salient components of a computing device, in which an embodiment of the present invention may be implemented.

According to one aspect, the present invention is directed towards one or more computer systems capable of carrying out the functionality described herein. An example of a computer system 800 is shown in FIG. 8. The computer system 800 includes one or more processors, such as processor 804. The processor 804 is connected to a computer system internal communication bus 802. Various software embodiments are described in terms of this exemplary computer system. After reading this description, it will become apparent to a person skilled in the relevant art(s) how to implement the invention using other computer systems and/or computer architectures.

Computer system 800 also includes a main memory 808, preferably random access memory (RAM), and may also include a secondary memory 810. The secondary memory 810 may include, for example, one or more hard disk drives 812 and/or one or more removable storage drives 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 822 and interfaces 820 which allow software and data to be transferred from the removable storage unit 822 to computer system 800. In general, Computer system 800 is controlled and coordinated by operating system (OS) software, which performs tasks such as process scheduling, memory management, networking and I/O services.

There may also be a communications interface 824 connecting to the bus 802. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824. The computer 800 communicates with other computing devices over a data network based on a special set of rules (i.e., a protocol). One of the common protocols is TCP/IP (Transmission Control Protocol/Internet Protocol) commonly used in the Internet. In general, the communication interface 824 manages the assembling of a data file into smaller packets that are transmitted over the data network or reassembles received packets into the original data file. In addition, the communication interface 824 handles the address part of each packet so that it gets to the right destination or intercepts packets destined for the computer 800. In this document, the terms "computer program medium", "computer readable medium", "computer recordable medium" and "computer usable medium" are used to generally refer to media such as removable storage drive 814 (e.g., flash storage drive), and/or a hard disk installed in hard disk drive 812. These computer program products are means for providing software to computer system 800. The invention is directed to such computer program products.

The computer system 800 may also include an input/output (I/O) interface 830, which provides the computer system 800 to access monitor, keyboard, mouse, printer, scanner, plotter, and alike.

Computer programs (also called computer control logic) are stored as application modules 806 in main memory 808 and/or secondary memory 810. Computer programs may also be received via communications interface 824. Such computer programs, when executed, enable the computer system 800 to perform the features of the present invention as discussed herein. In particular, the computer programs, when executed, enable the processor 804 to perform features of the present invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. The application module 806, when executed by the processor 804, causes the processor 804 to perform the functions of the invention as described herein.

The main memory 808 may be loaded with one or more application modules 806 that can be executed by one or more processors 804 with or without a user input through the I/O interface 830 to achieve desired tasks. In operation, when at least one processor 804 executes one of the application modules 806, the results are computed and stored in the secondary memory 810 (i.e., hard disk drive 812). The status of the CAE analysis or design optimization (e.g., samples selected based on GA) is reported to the user via the I/O interface 830 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the number of design objectives and variables has been shown as two, in reality, a larger number of design objectives and variables have been used. Additionally, whereas finite element analysis has been described and shown for evaluating design objectives, other types of CAE analysis such as finite difference analysis or meshfree analysis, etc. can be used to achieve the same. Furthermore, whereas the size of populations or design alternatives at each generation is shown and described as a fixed number (e.g., four (4) in FIG. 6), other sizes can be used instead. In fact, non-fixed numbers can also be used to achieve the same. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A computer-implemented method of performing a multi-objective evolutionary algorithm (MOEA) based engineering design optimization of a product, said method comprising:
    creating an archive in a storage device coupled to a computer system configured for performing the MOEA based engineering design optimization, the engineering design optimization comprises a plurality of generations in accordance with an evolution scheme of MOEA, each of the generations containing a set of product design alternatives in a predefined design space of the product;
    obtaining a corresponding set of solutions by evaluating each of the product design alternatives in accordance with design objectives;
    updating the archive with one or more non-dominated solutions after said evaluation of said each of the generations, said one or more non-dominated solutions being determined from the corresponding set of solutions and the archive's existing members;
    creating a termination criterion of the MOEA based optimization from an optimization performance indicator derived from the archive's update history that include total number of members, number of members being culled and number of members being added at said each of the generations, said termination criterion including when a consolidation ratio is greater than 0.25 at current generation, said consolidation ratio being configured as said optimization performance indicator as a ratio of number of members in the archive at a prior generation that are also present in the archive at the current generation to the total number of members in the archive at the current generation; and
    designating the non-dominated solutions in the archive as a set of optimized product designs when the termination criterion has been met.

2. The method of claim 1, said obtaining the corresponding set of solutions further comprises conducting a computer aided engineering analysis of said each of the product design alternatives.

3. The method of claim 1, said updating the archive further comprises
    culling one or more of existing members of the archive when said one or more of the members become dominated by any of said one or more non-dominated solutions; and
    adding said newly-determined one or more non-dominated solutions into the archive when no duplicate exists.

4. The method of claim 1, wherein said prior and said current generations are apart with a generation gap of at least one generation.

5. The method of claim 1, wherein said termination criterion further comprises a confirmation of a "knee" formation of the optimization performance indicator.

6. The method of claim 5, wherein the termination criterion is configured as a fixed threshold value such that the MOEA based optimization terminates when the optimization performance indicator at the current generation has exceeded the fixed threshold.

7. The method of claim 5, wherein the termination criterion is configured as a predefined threshold utility value such that the MOEA based optimization terminates when a utility function has fallen below the predefined threshold utility value, said utility function ($U_i$) is defined as $U_i = (OPI_i - OPI_{i-\Delta})/\Delta$
    where $OPI_i$ is the optimization performance indicator at the current generation, $OPI_{i-\Delta}$ is the optimization performance indicator at the prior generation and $\Delta$ is the generation gap.

8. The method of claim 7, wherein the termination criterion is configured to use an average generation utility ($U_i^*$) calculated as a moving average of $U_i$ and $U_{i-\Delta}$, which are the utility at i-th generation and at "i-$\Delta$"-th generation, respectively.

9. The method of claim 7, wherein the predefined threshold utility value is calculated based on an initial average generation utility when the consolidation ratio has reached at least 0.25.

10. A computer readable medium containing instructions for controlling a computer system for performance of a multi-objective evolutionary algorithm (MOEA) based engineering design optimization of a product by a method comprising:
    creating an archive in a storage device coupled to a computer system configured for performing the MOEA based engineering design optimization, the engineering design optimization comprises a plurality of generations in accordance with an evolution scheme of MOEA, each of the generations containing a set of product design alternatives in a predefined design space of the product;
    obtaining a corresponding set of solutions by evaluating each of the product design alternatives in accordance with design objectives;

updating the archive with one or more non-dominated solutions after said evaluation of said each of the generations, said one or more non-dominated solutions being determined from the corresponding set of solutions and the archive's existing members;

creating a termination criterion of the MOEA based optimization from an optimization performance indicator derived from the archive's update history that include total number of members, number of members being culled and number of members being added at said each of the generations, said termination criterion including when a consolidation ratio is greater than 0.25 at current generation, said consolidation ratio being configured as said optimization performance indicator as a ratio of number of members in the archive at a prior generation that are also present in the archive at the current generation to the total number of members in the archive at the current generation; and designating the non-dominated solutions in the archive as a set of optimized product designs when the termination criterion has been met.

11. A system for estimating performance of a multi-objective evolutionary algorithm (MOEA) based engineering design optimization of a product, said system comprising:

a main memory for storing computer readable code for at least one application module;

at least one processor coupled to the main memory, said at least one processor executing the computer readable code in the main memory to cause the at least one application module to perform operations by a method of:

creating an archive in a storage device coupled to the system, the engineering design optimization comprises a plurality of generations in accordance with an evolution scheme of MOEA, each of the generations containing a set of product design alternatives in a predefined design space of the product;

obtaining a corresponding set of solutions by evaluating each of the product design alternatives in accordance with design objectives;

updating the archive with one or more non-dominated solutions after said evaluation of said each of the generations, said one or more non-dominated solutions being determined from the corresponding set of solutions and the archive's existing members;

creating a termination criterion of the MOEA based optimization from an optimization performance indicator derived from the archive's update history that include total number of members, number of members being culled and number of member being added at said each of the generations, said termination criterion including when a consolidation ratio is greater than 0.25 at current generation, said consolidation ratio being configured as said optimization performance indicator as a ratio of number of members in the archive at a prior generation that are also present in the archive at the current generation to the total number of members in the archive at the current generation; and designating the non-dominated solutions in the archive as a set of optimized product designs when the termination criterion has been met.

* * * * *